United States Patent
Colont et al.

(10) Patent No.: US 10,724,533 B2
(45) Date of Patent: Jul. 28, 2020

(54) BEARING ANTI-ROTATION SPACER WITH INTEGRATED OIL DEFLECTION FEATURES

(71) Applicant: BorgWarner Inc., Auburn Hills, MI (US)

(72) Inventors: Craig Andrew Colont, Candler, NC (US); Timothy Mark House, Mills River, NC (US)

(73) Assignee: BorgWarner Inc., Auburn Hills, MI (US)

( * ) Notice: Subject to any disclaimer, the term of this patent is extended or adjusted under 35 U.S.C. 154(b) by 180 days.

(21) Appl. No.: 15/941,488

(22) Filed: Mar. 30, 2018

(65) Prior Publication Data

US 2019/0301481 A1    Oct. 3, 2019

(51) Int. Cl.
*F04D 29/06* (2006.01)
*F04D 29/063* (2006.01)
(Continued)

(52) U.S. Cl.
CPC ......... *F04D 29/063* (2013.01); *F01D 25/162* (2013.01); *F01D 25/18* (2013.01); *F04D 25/045* (2013.01); *F04D 29/051* (2013.01); *F04D 29/053* (2013.01); *F04D 29/0563* (2013.01); *F16C 19/06* (2013.01); *F02B 37/00* (2013.01); *F05D 2220/40* (2013.01); *F16C 33/667* (2013.01); *F16C 33/6685* (2013.01);
(Continued)

(58) Field of Classification Search
CPC .... F04D 29/063; F04D 25/045; F04D 29/051; F04D 29/053; F04D 29/0563; F01D 25/162; F01D 25/18; F16C 19/06; F16C 33/667; F16C 35/02; F16C 33/6685; F16C 35/067; F16C 2360/24; F05D 2220/40; F02B 37/00
See application file for complete search history.

(56) References Cited

U.S. PATENT DOCUMENTS 5,207,566 A      5/1993 Munkel et al.
8,496,452 B2 *   7/2013 Marsal ............... F01D 25/162
                                              384/906
(Continued)

FOREIGN PATENT DOCUMENTS

DE    10 2015 220384 A1      4/2017
DE    102015220384 A1 *      4/2017 ............. F16B 21/18
EP    2 850 300 A1           3/2015
JP    S61 11424 A            1/1986

*Primary Examiner* — Eldon T Brockman
(74) *Attorney, Agent, or Firm* — Young Basile Hanlon & MacFarlane, P.C.

(57) ABSTRACT

A turbocharger includes a compressor housing, a turbo shaft, a bearing housing, a bearing cartridge, and a spacer. The compressor housing includes a backplate. The turbo shaft extends through the backplate and the bearing housing, and is rotatable about an axis. The backplate is positioned between an interior of the compressor housing and an interior of the bearing housing. The bearing cartridge is positioned in the bearing housing and rotatably supports the turbo shaft therein. The spacer is engaged with the bearing housing and an outer radial portion of the bearing cartridge to prevent rotation therebetween. The spacer includes a deflector formed integrally therewith that directs a lubricant axially away from the compressor housing.

22 Claims, 6 Drawing Sheets

(51) Int. Cl.
*F04D 25/04* (2006.01)
*F04D 29/051* (2006.01)
*F04D 29/053* (2006.01)
*F04D 29/056* (2006.01)
*F16C 19/06* (2006.01)
*F01D 25/16* (2006.01)
*F01D 25/18* (2006.01)
*F02B 37/00* (2006.01)
*F16C 33/66* (2006.01)
*F16C 35/02* (2006.01)
*F16C 35/067* (2006.01)

(52) U.S. Cl.
CPC ............ *F16C 35/02* (2013.01); *F16C 35/067* (2013.01); *F16C 2360/24* (2013.01)

(56) References Cited

U.S. PATENT DOCUMENTS

| | | |
|---|---|---|
| 8,857,180 B2 | 10/2014 | Begin et al. |
| 8,888,447 B2 | 11/2014 | House et al. |
| 9,181,955 B1 | 11/2015 | House |
| 9,528,389 B2 | 12/2016 | Koerner et al. |
| 9,581,044 B2 | 2/2017 | House et al. |
| 9,771,946 B2 | 9/2017 | Krejci et al. |
| 9,810,231 B2 * | 11/2017 | Daguin .................. F01D 25/162 |
| 2011/0052429 A1 * | 3/2011 | Marsal .................. F01D 25/162 417/407 |
| 2015/0093233 A1 * | 4/2015 | Daguin .................. F01D 25/162 415/1 |
| 2016/0177784 A1 | 6/2016 | Archer et al. |
| 2017/0254557 A1 | 9/2017 | Chiu |

\* cited by examiner

BEARING ANTI-ROTATION SPACER WITH INTEGRATED OIL DEFLECTION FEATURES

TECHNICAL FIELD

This disclosure generally relates to turbochargers.

BACKGROUND

Turbochargers are forced-induction devices used with internal combustion engines and are utilized to increase the pressure and density of intake air provided to the engine. Exhaust gas from the engine is routed to the turbocharger and is utilized to drive a turbine wheel. The torque generated by the turbine wheel rotates a compressor wheel via a turbo shaft, and the compressor wheel pressurizes intake air for supply to the engine. By pressurizing the intake air, the amount of air and fuel that can be forced into each engine cylinder during an intake stroke of the engine is increased. This produces an increased power output relative to a naturally-aspirated engine.

Turbochargers may be employed in demanding environments of vehicle engine compartments, or other applications (e.g., for electricity generation). The internal moving components of turbochargers further operate at very high revolutions and at high temperatures. Due to these operating conditions, it is important to continually lubricate the moving turbocharger components to cool the components and reduce wear. To supply lubricant to the internal components, turbochargers are connected to the engine lubrication system and are supplied pressurized oil. The pressurized oil is routed to bearing cartridges rotatably supporting the turbo shaft connecting the turbine wheel and compressor wheel and is then returned to the engine lubrication system for filtering and cooling of the oil.

To contain lubricant (e.g., engine oil) in the turbocharger lubrication system, seals and other features are employed at various points along the lubrication path to direct lubricant away from undesired areas and turbocharger components (e.g., away from the compressor housing). Due to the high rotation speeds, high temperatures, need for lubricant containment, and manufacturing and assembly cost and complexity, it may be advantageous to reduce the number of turbocharger components, including those along the lubrication path to reduce the need for additional seals and sealing techniques.

It would be advantageous to provide a turbocharger that improves on, or resolves, disadvantages with conventional turbocharger designs, reduces the complexity in design and assembly, and increases performance and durability of the turbocharger lubrication system and the turbocharger overall.

SUMMARY

Disclosed herein are aspects, features, elements, implementations, and embodiments of turbochargers including a bearing anti-rotation spacer component with an integral lubricant deflector.

In one implementation, a turbocharger includes a compressor housing, a turbo shaft, a bearing housing, a bearing cartridge, and a spacer. The compressor housing includes a backplate. The turbo shaft extends through the backplate and the bearing housing, and is rotatable about an axis. The backplate is positioned between an interior of the compressor housing and an interior of the bearing housing. The bearing cartridge is positioned in the bearing housing and rotatably supports the turbo shaft therein. The spacer is engaged with the bearing housing and an outer radial portion of the bearing cartridge to prevent rotation therebetween. The spacer includes a deflector formed integrally therewith that directs a lubricant axially away from the compressor housing.

In one implementation, a turbocharger includes a compressor housing, a turbo shaft, a bearing housing, a bearing cartridge, a flinger, and a spacer. The compressor housing includes a backplate. The turbo shaft extends through the backplate and the bearing housing. The backplate is positioned between an interior of the compressor housing and an interior of the bearing housing. The bearing cartridge is positioned in the bearing housing and rotatably supports the turbo shaft therein. The flinger is concentrically positioned about the turbo shaft for rotation therewith and includes a radially-extending flange. The spacer is engaged with the bearing housing and an outer radial portion of the bearing cartridge to prevent rotation therebetween. The spacer extends radially inward to an inner radial perimeter through which the turbo shaft and the flinger extend. The spacer is positioned axially between the radially-extending flange and the backplate.

In one implementation, a turbocharger includes a compressor housing, a bearing housing, a turbo shaft, a bearing cartridge, a spacer, a first connector, and a flinger. The compressor housing includes a backplate. The turbo shaft extends through the backplate and the bearing housing and is rotatable about an axis. The bearing cartridge is positioned in the bearing housing and engaged with the turbo shaft. The spacer is positioned between the backplate and the bearing housing. The spacer includes a first rearward axial face, a first inner radial wall, a second rearward axial face, a second inner radial wall, and an integral lubricant deflector. The first rearward axial face is positioned axially forward from and opposed to the bearing cartridge. The first inner radial wall is connected to the first rearward axial face and extends axially along the axis. The first rearward axial face and the first inner radial wall define a bearing pocket that engages and prevents rotation of an outer radial portion of the bearing cartridge relative to the bearing housing. The second rearward axial face is connected to the first inner radial wall and extends radially outward therefrom. The second inner radial wall is connected to the second rearward axial face and extends therefrom along the axis. The second rearward axial face and the second inner radial wall define a first connector pocket. The integral lubricant deflector includes a pair of walls and a guide surface. The guide surface is connected to the pair of walls and defines a lubricant deflector trough in communication with the bearing pocket and the first connector pocket. The integral lubricant deflector is operable to deflect lubricant exiting the bearing cartridge axially away from the compressor housing. The first connector is positioned in the first connector pocket. The first connector is engaged with the bearing cartridge to prevent axial movement of the bearing cartridge relative to the spacer along the axis. The flinger extends axially through the backplate and is concentrically positioned about the turbo shaft. The flinger includes a radially extending flange that axially opposes the first rearward axial face of the spacer.

These and other aspects of the present disclosure are disclosed in the following detailed description of the embodiments, the appended claims and the accompanying figures.

BRIEF DESCRIPTION OF THE DRAWINGS

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
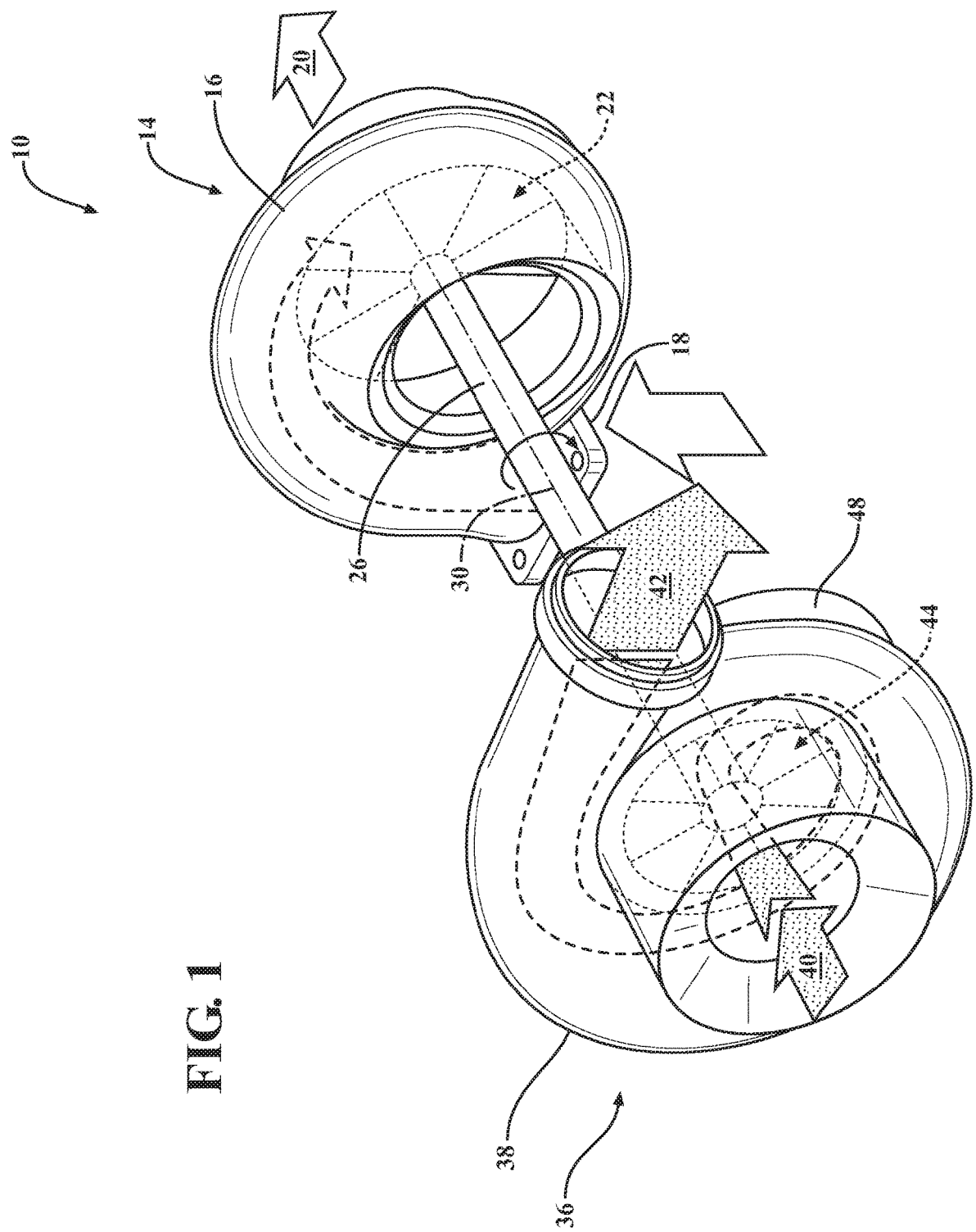
FIG. 1 is schematic perspective view of a conventional turbocharger shown without a bearing housing or bearings.

FIG. 1 shows a portion of a conventional turbocharger 10, which is an exhaust-gas driven forced-induction device that is utilized in conjunction with an internal combustion engine (not shown). The turbocharger 10 includes a turbine 14 having a turbine housing 16. The turbine housing 16 includes an exhaust gas inlet 18 for receiving exhaust gas from the internal combustion engine and an exhaust gas outlet 20. Exhaust gases are routed from the exhaust gas inlet 18 to a turbine wheel 22 before exiting the turbine housing 16 at the exhaust gas outlet 20.

The turbocharger 10 further includes a turbo shaft 26 connected to the turbine wheel 22 for rotation about an axis 30 (e.g., axis of rotation). The turbo shaft 26 is engaged and rotatably supported axially and/or radially by one or more bearing cartridges (not shown in FIG. 1 and discussed further below). The turbo shaft 26 and the bearing cartridges are enclosed by a bearing housing (not shown in FIG. 1) and rotate relative to the bearing housing. In certain applications, the turbo shaft 26 may rotate at speeds in excess of 300,000 revolutions per minute.

The bearing housing typically incorporates a lubricant system which is in fluid communication with the engine's internal lubricant system (e.g., an oil system used for lubrication and/or cooling). The lubricant system of the turbocharger 10 provides one or more channels for lubricant, for example engine oil or other suitable fluid, to pass through an entry port (see, e.g., port 84) in the bearing housing 52, pass through the bearing cartridges, and then exit the bearing housing to a lubricant exit channel for passage back into the engine lubricant system for filtration and cooling of the lubricant.

The turbocharger 10 further includes a compressor 36 including a compressor housing 38. The compressor housing 38 includes an intake air inlet 40 and an intake air outlet 42. Intake air is routed from the intake air inlet 40 to a compressor wheel 44 connected to the turbo shaft 26. Air received from the intake air inlet 40 is pressurized by rotation of the compressor wheel 44. The intake air then exits the compressor housing 38 at the intake air outlet 42 before being supplied to the internal combustion engine. In the example shown, the compressor housing 38 includes a backplate 48 for mounting the compressor housing 38 to the bearing housing as further described below. It is understood that the turbocharger 10 can take other forms and configurations, and include additional or alternate components, features and functions, than those described above.

Figure 2:
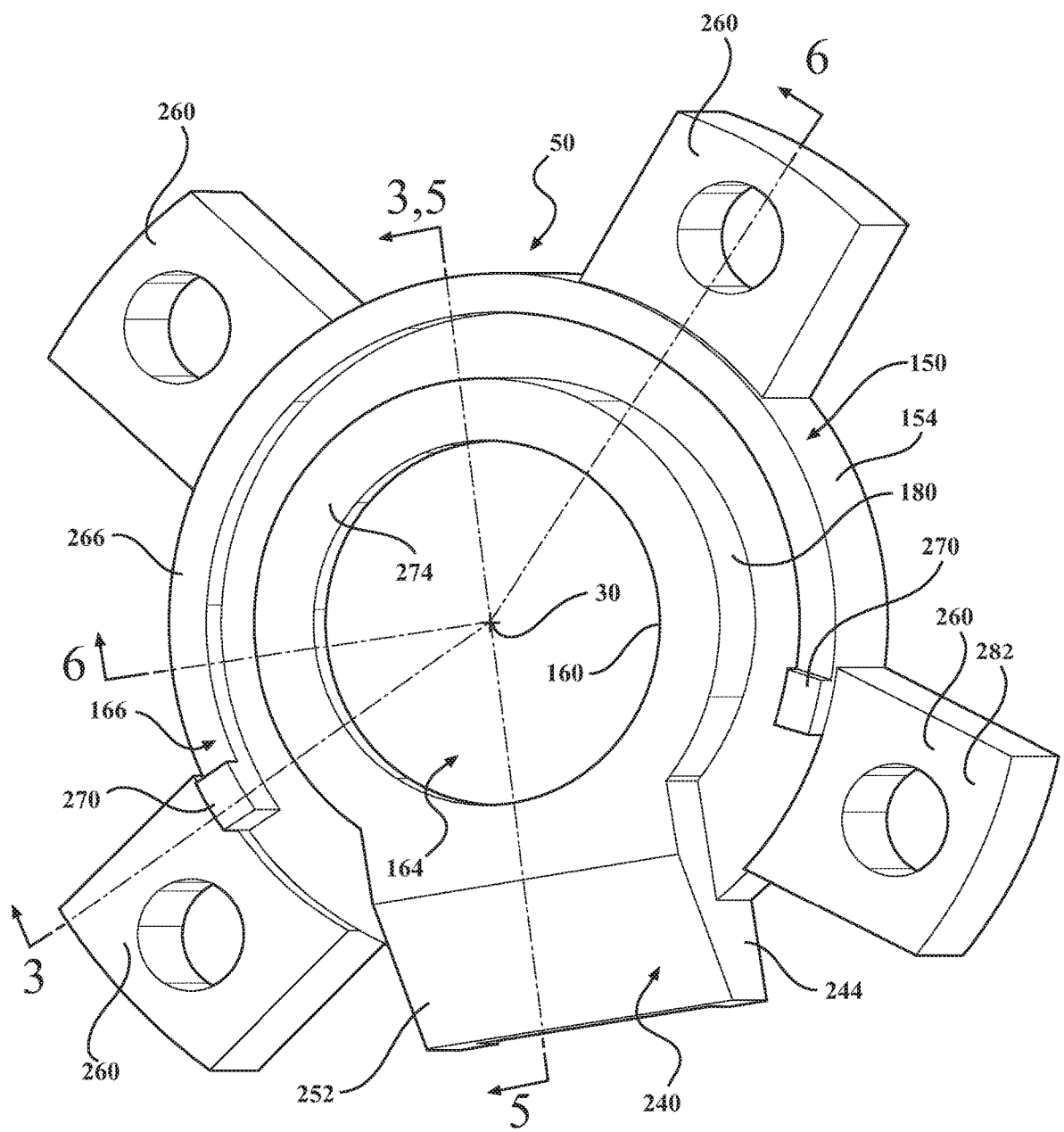
FIG. 2 is a frontal perspective view of one example of a bearing anti-rotation spacer with an integral lubricant deflector.
Figure 3:
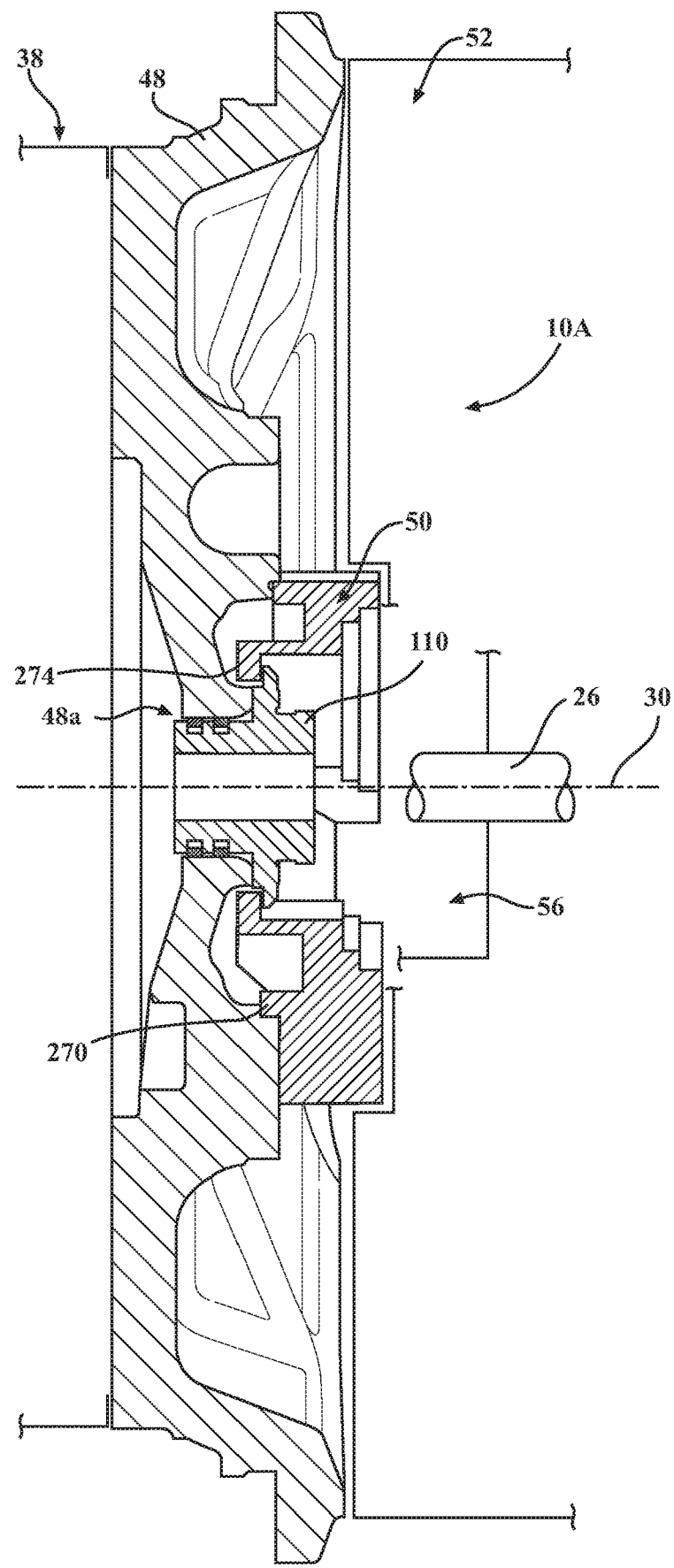
FIG. 3 is a cross-sectional view of the turbocharger taken along line 3-3 in FIG. 2 of the spacer.
Figure 4:
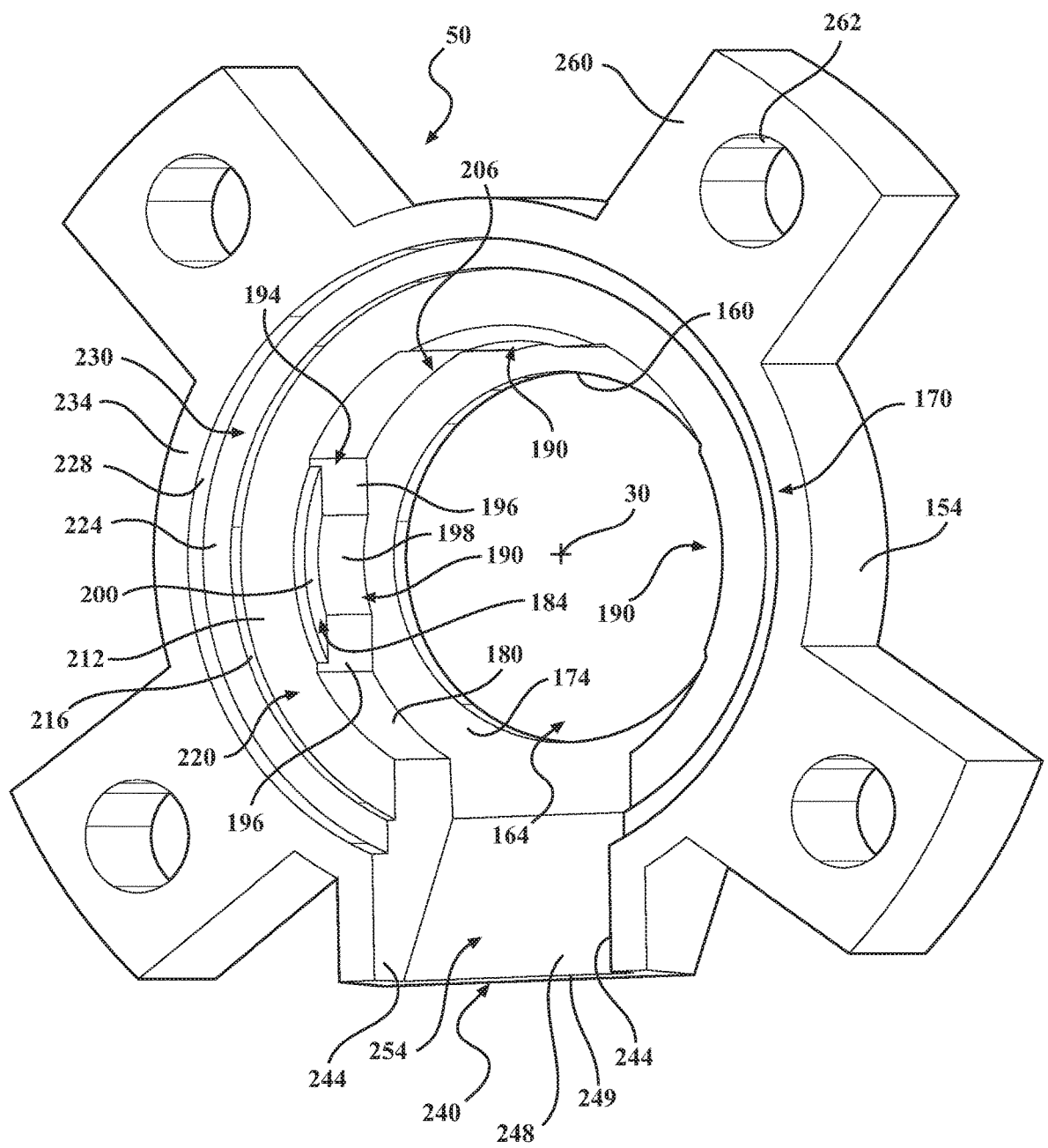
FIG. 4 is a rearward perspective view of the bearing anti-rotation spacer of FIG. 2.
Figure 5:
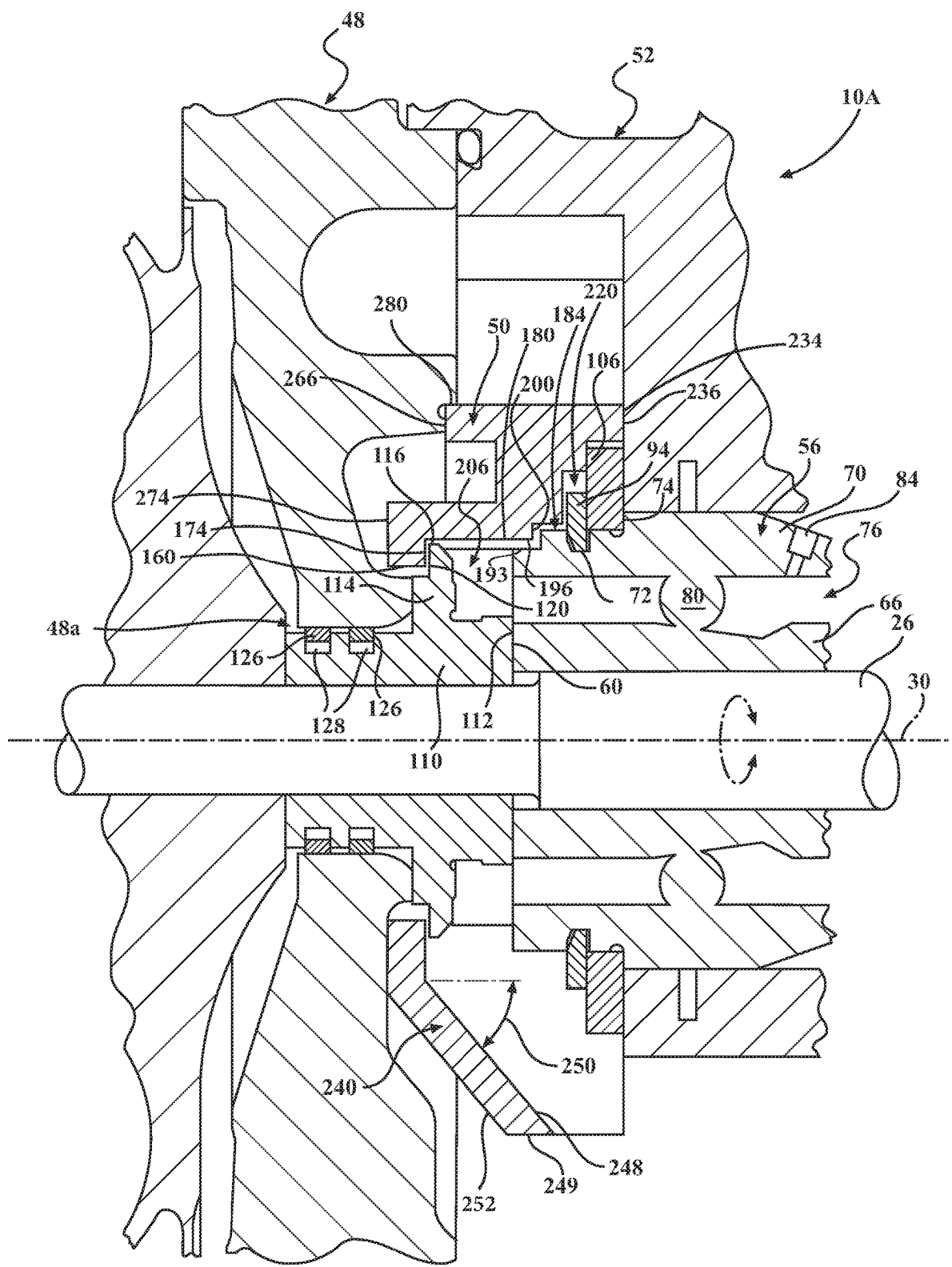
FIG. 5 is a cross-sectional view of the turbocharger taken along line 5-5 in FIG. 2 of the spacer.
Figure 6:
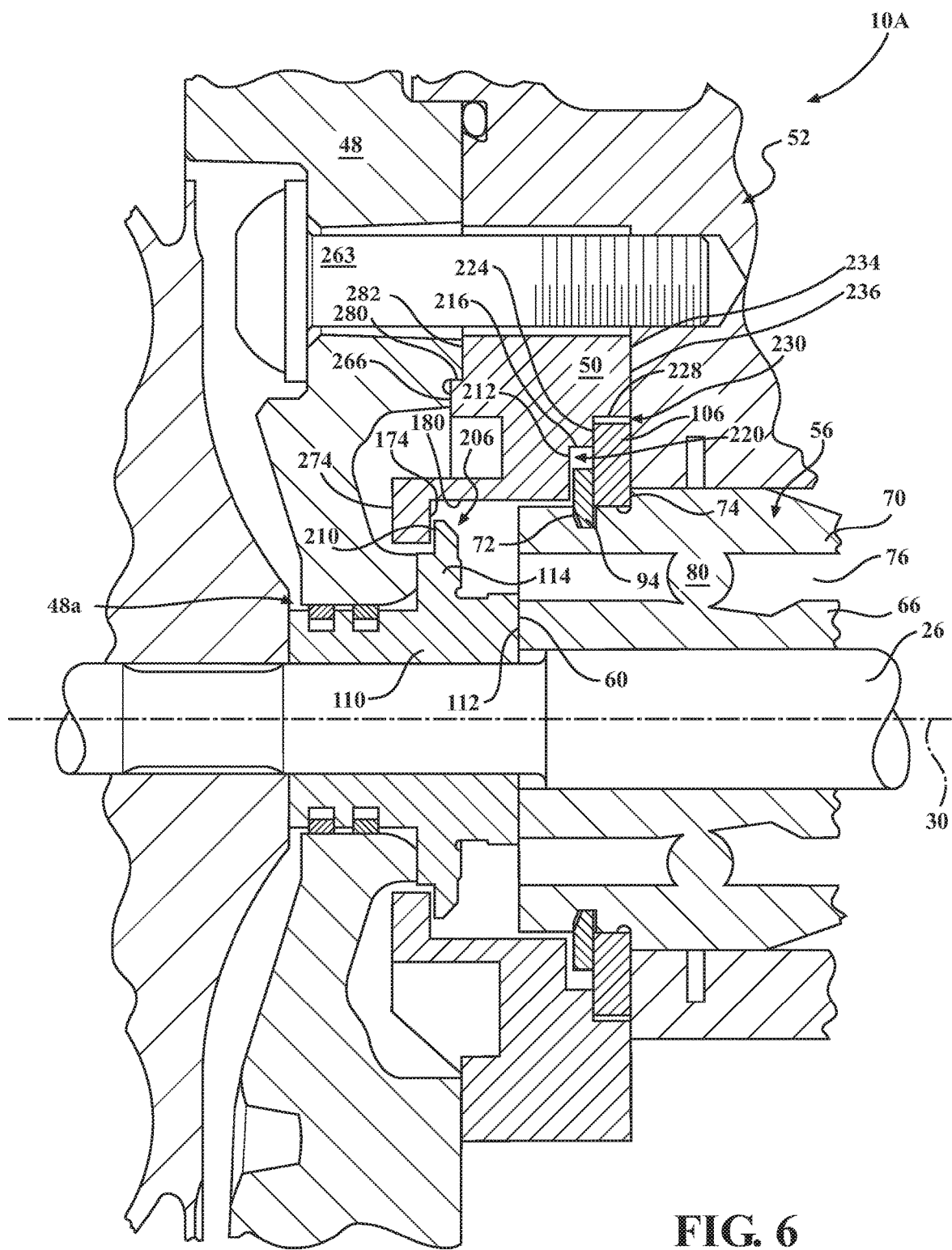
FIG. 6 is cross-sectional view of the turbocharger taken along line 6-6 in FIG. 2 of the spacer.

FIGS. 2-6 illustrate a spacer 50 (e.g., a bearing anti-rotation spacer) with a deflector 240 (e.g., a lubricant or oil deflector) integrated therewith according to one exemplary embodiment. The spacer 50 is shown in isolation in FIGS. 2 and 4 and disposed in a turbocharger 10A according to an exemplary embodiment, as generally described above, in FIG. 3. The turbocharger 10A may, for example, be used in a vehicular application (e.g., in a passenger or commercial vehicle), power generation application (e.g., in an electrical generator), or other application. As illustrated in FIG. 3, the spacer 50 is positioned between and engaged with the backplate 48 and a bearing housing 52. In FIG. 3, several components of the turbocharger 10A have been omitted for clarity. In FIGS. 5 and 6, certain components of the turbocharger 10A have been included. In particular, in FIGS. 5 and 6, the spacer 50 is shown in an exemplary application with a bearing cartridge 56 having a forward axial end 60 facing the backplate 48. The backplate 48 separates an interior of the compressor housing 38 from an interior of the bearing housing 52. The spacer 50 prevents rotation of an outer radial portion (e.g., an outer race) of the bearing cartridge 56 relative to the bearing housing 52 and is also configured to redirect a fluid (e.g., a lubricant, such as engine oil) away from the compressor housing 38 toward an interior of the bearing housing 52. The backplate 48 may, as shown, be a component that is separable from the compressor housing 38. Alternatively, the backplate 48 may be an integral portion of the compressor housing 38.

As used herein, the terms "inner" and "outer" or similar (e.g., inward, outward, etc.) generally refer to radial directions moving, respectively, toward and away from the axis 30 of the turbo shaft 26. For example, an inner radial surface may be a surface facing radially inward toward the axis 30. In some instances, the term "inner" and "outer" may also refer to directions relative to an interior of the bearing housing 52. The terms "forward" and "rearward" generally refer to axial directions moving along the axis 30 of the turbo shaft 26, respectively, toward and away from the compressor 36). For example, a forward axial surface may be a surface facing axially toward the compressor 36. It should be noted, however, that different directional terms and/or frames of reference may be used (e.g., "forward" or "first direction" may instead be used to refer to the axial direction moving toward the turbine 32).

In the illustrated exemplary embodiment, the bearing cartridge 56 comprises a ball bearing assembly having an inner race 66 (e.g., a radially inner race or a radially inner portion), an outer race 70 (e.g., a radially outer race or a radially outer portion), and ball bearings 80 arranged therebetween to facilitate rotation of the inner race 66 relative to the outer race 70. The inner race 66 is concentrically positioned about and engaged with the turbo shaft 26. The turbo shaft 26 and the inner race 66 may be engaged with each other so as to rotate in unison about the axis 30. Alternatively, the bearing cartridge 56 may be configured as a journal bearing (e.g., a non-floating journal bearing), which is rotationally fixed to the bearing housing 52 (e.g., with the spacer 50) and which rotatably supports the turbo shaft 26 with an oil film interface therebetween (e.g., omitting the ball bearings 80 and the inner race 66).

The outer race 70 is receivable by the spacer 50 to be prevented or limited from moving axially and rotationally about the axis 30. The outer race 70 includes a first outer radial surface 70a in a first axial region and a second outer radial surface 70b in a second axial region. The second outer radial surface 70b of the outer race 70 is larger in diameter than the first outer radial surface 70a and is positioned axially rearward of the first outer radial surface 70a. The first outer radial surface 70a and the second outer radial surface 70b may, for example, be cylindrical. A shoulder 74 extends radially outward from the first outer radial surface 70a to the second outer radial surface 70b. For example, the shoulder 74 may extend perpendicular (e.g., in a plane) relative to the axis 30.

The outer race 70 includes a radial channel 72 that is recessed radially inward from the first outer radial surface 70a and is spaced axially forward from shoulder 74 along the axis 30. A first connector 94 is positioned in the radial channel 72 and a second connector 106 is positioned axially between the first connector 94 and the shoulder 74. For example, the second connector 106 may be held axially between the first connector 94 and the shoulder 74 to prevent or limit axial movement of the second connector 106 relative to the outer race 70. The second connector 106 is, in turn, positioned (e.g., held) axially between portions of the spacer 50 and the bearing housing 52 to prevent or limit axial movement of the second connector 106 and, thereby, the outer race 70 relative to the spacer 50 and the bearing housing 52. Thus, the outer race 70 may be considered engaged with the spacer 50 through the first connector 94 positioned in the radial channel 72 of the outer race 70 and the second connector 106 held between the radial channel 72 and the shoulder 74 of the outer race 70. The first connector 94 and/or the second connector 106 thereby prevent axial movement of the bearing cartridge 56 relative to the spacer 50 and/or the bearing housing 52 along the axis 30. In one example, the first connector is a mechanical fastener in the form of a snap ring, and the second connector 106 is a thrust washer. Other mechanical fasteners and fastening mechanisms may be used. It is understood that only one connector, for example either the first connector 94 or the second connector 106, may be used to axially secure the bearing cartridge relative to the spacer 50.

The inner race 66 and the outer race 70 of the bearing cartridge 56 define a bearing cavity 76 housing of one or more of the ball bearings 80. On rotation of the turbo shaft 26, the inner race 66 of the bearing cartridge rotates about the axis 30 with the turbo shaft 26, while the outer race 70 remains rotationally fixed to the spacer 50 and, thereby, the bearing housing 52.

As best seen in FIG. 5, the turbocharger 10A further includes a flinger 110 concentrically positioned about the turbo shaft 26 and positioned adjacent the spacer 50 as further discussed below. The flinger 110 extends through the backplate 48 and rotates with the turbo shaft 26. The flinger 110 is configured to inhibit or prevent the lubricant from passing through the backplate 48 from the bearing housing 52 to the compressor 36. The flinger 110 includes a cylindrical body (e.g., a cylindrical portion) and a radially-extending arm 114 (e.g., a radially-extending flange) that extends radially outward from the cylindrical body to terminate in an apex 116. The cylindrical portion extends through an aperture 48a in the backplate 48 and terminates at a rearward axial end 112 that may be engaged with the forward axial end 60 of the inner race 66. The radially-extending arm 114 further defines a forward axial face 120 positioned in close axial proximity and radially overlapping orientation with the spacer 50. The forward axial face 120, in a radially inner region, may also face and/or abut a rearward axial face of the backplate 48 surrounding the aperture thereof, which faces axially rearward toward the bearing housing 52. The portion of the forward axial face 120 of the radially-extending arm 114 that radially overlaps the spacer 50 may be spaced axially rearward from the portion of the forward axial face 120 that faces forward toward the backplate 48. The flinger 110 includes one or more radial seals 126 in circumferential grooves 128 of the cylindrical portion thereof. The radials seals 126 are, for example, piston rings (e.g., metal rings) engaged with the portion of the backplate 48 defining the aperture 48a to prevent lubricant from passing axially forward through the backplate 48.

It is understood that the bearing cartridge 56 and the flinger 110 of the turbocharger 10A may include alternate forms, configurations, sizes, and additional or alternate components, than those generally described and illustrated. For example, the bearing cartridge 56 may have alternatively configured bearings other than the ball bearings 80. For example, the bearing cartridge 56 may instead include cylindrical bearings, lubricant films, or other bearing devices.

Referring to FIG. 2, the illustrated spacer 50 with the deflector 240 for exemplary use in turbocharger 10A is shown. The spacer 50 includes a body 150 having an outer radial surface 154 (e.g., an outer radial perimeter or outer perimeter) and an inner radial surface 160 (e.g., an inner radial perimeter or inner perimeter) defining an opening 164. The outer radial surface 154 and/or the inner radial surface 160 may be generally circular in cross-section with a constant or varying radius (e.g., being cylindrical, conical, or otherwise tapered). In an assembled turbocharger 10A, as best seen in FIGS. 5 and 6, the turbo shaft 26 axially extends through the bearing housing 52, the bearing cartridge 56, the opening 164 of the spacer 50, the flinger 110, and the backplate 48.

The spacer 50, in particular the body 150 thereof, includes a forward axial side 166 (see FIG. 2) facing or opposing the backplate 48 and a rearward axial side 170 (see FIG. 4) facing or opposing the bearing housing 52. Referring to FIG. 4, the rearward axial side 170 of the body 150 of the spacer 50 includes a first rearward axial face 174 concentrically positioned about the axis 30 and the turbo shaft 26. The first rearward axial face 174 extends radially outward from the inner radial surface 160. For example, the first rearward axial face 174 may be substantially planar in a direction perpendicular to the axis 30 (e.g., being arranged in a plane perpendicular to the axis 30) or have another suitable shape (e.g., being tapered, such as being conical, relative to the axis 30).

As best seen in FIGS. 4, 5 and 6, the rearward axial side 170 of the spacer 50 further includes a first inner radial wall 180 (e.g., circumferential wall) extending from the first rearward axial face 174 and axially rearward (toward the bearing housing 52) therefrom along the axis 30. The first inner radial wall 180 forms an inner radial surface that faces radially inward toward the axis 30. Portions of the first inner radial wall 180 may, for example, be generally circular in cross-section with a constant or varying radius (e.g., being cylindrical, conical, or otherwise tapered).

As referenced above, the spacer 50 is configured to prevent rotation of the outer race 70 of the bearing cartridge 56. In one exemplary embodiment, as best seen in FIGS. 4 and 5, the spacer 50 further includes one or more anti-rotation features configured as a spacer bearing member 190 (e.g., spacer bearing portion). The spacer bearing member 190 is connected to and/or formed with the first rearward axial face 174 and the first inner radial wall 180 so as to extend axially from the first rearward axial face 174 and/or radially inward from the first inner radial wall 180 (e.g., inward from the curved surfaces thereof). In the example shown, the spacer bearing member 190 includes a bearing wall 194 that extends radially inwardly from a curved surface of the first inner radial wall 180 (e.g., similar to a chord across a circle) and axially rearward from the first rearward axial face 174 along an axis 130. For example, the bearing wall 194 includes one or more planar surfaces 196, such as two planar surfaces separated by a radially-scalloped portion 198 (as shown). The spacer bearing member 190 may also include a bearing axial face 200 that is positioned axially forward of a second rearward axial face 212 (discussed below).

In the exemplary embodiment illustrated in FIG. 4, the spacer 50 includes three spacer bearing members 190 disposed about a periphery of the first inner radial wall 180. In various embodiments, the spacer 50 could include one spacer bearing member 190, two spacer bearing members 190, or more than three spacer bearing members 190.

In the exemplary embodiment illustrated in FIGS. 4 and 5, the spacer bearing members 190 and the first inner radial wall 180 form a bearing pocket or space 184 for receipt of a portion of the bearing cartridge 56 (as best seen in FIG. 5). In the FIG. 5 position, coordinating planar surfaces 193 (e.g., bearing cartridge planar surfaces) on the outer race 70 of the bearing cartridge 56 align and abuttingly engage with the planar surfaces 196 of the spacer bearing members 190 in a tangential direction relative to the axis 30. This engagement of the coordinating planar surfaces of the spacer 50 and the outer race 70 prevents the outer race 70 of the bearing cartridge 56 from rotating relative to the spacer 50 about the axis 30.

It should be understood that the spacer 50 may otherwise prevent rotation of the outer race 70, for example, by including one or more anti-rotation features configured differently than the spacer bearing member 190 described previously. For example, the spacer bearing member 190 can take other forms, orientations, shapes, sizes, positions and locations on spacer 50 to accommodate the bearing cartridge 56 and/or the turbocharger 10A design and configuration. It is further understood that the bearing cartridge 56 may utilize anti-rotation features, such as structures and devices other than the spacer bearing member 190 and variations thereof. Such other anti-rotation features may, for example, include bosses or protrusions of the spacer 50 that are received axially and/or radially into corresponding recesses in the outer race 70 to engage the spacer 50 to prevent relative rotation between the outer race 70 of the bearing cartridge 56 and the spacer 50.

Still referring to FIGS. 4 and 5, a flinger pocket 206 is defined axially between the first rearward axial face 174 of the spacer 50 and the forward axial end 60 of the bearing cartridge 56 and defined radially inward of the spacer bearing members 190. In the example shown in FIG. 5, on installation of the flinger 110 and bearing cartridge 56, the flinger pocket 206 provides a space or volume for the radially-extending arm 114 of the flinger 110 to radially extend into the flinger pocket 206 to generally align and position the forward axial face 120 in close position and orientation to the first rearward axial face 174 of the spacer 50 as generally shown to form lubricant gap 210 therebetween (discussed below).

In the example, the apex 116 and the forward axial face 120 of the flinger 110 extend radially outward beyond the inner radial surface 160 of the spacer 50 to radially overlap a portion of the first rearward axial face 174 forming the lubricant gap 210 axially therebetween. In one objective, the lubricant gap 210 is designed to be in order to resist or prevent lubricant, for example engine oil, from passing through the lubricant gap 210 toward the backplate 48 and potentially into the compressor housing 38. In one example, the lubricant gap 210 (i.e., the axial spacing between the first rearward axial face 174 of the spacer 50 and the forward axial face 120 of the flinger 110) is approximately 0.75 mm or less (e.g., 0.5 mm or less). For example, the flinger pocket 206 may also be defined radially between the radially-scalloped portions 198 of the spacer bearing members 190 to receive the radially-extending arm 114 of the flinger 110 in close proximity to the backplate 48. It is understood that larger or smaller lubricant gaps 210 or distances between the forward axial face 120 and the first rearward axial face 174 can be used. It is further understood that different forms, configurations, shapes and sizes of the radially-extending arm 114 and the forward axial face 120 may be used.

The first rearward axial face 174 of the spacer 50 is arranged between the backplate 48 and the radially-extending arm 114 of the flinger 110. The inner radial surface 160 of the spacer 50 may axially overlap the rearward axial face (not labeled) of the backplate 48, which surrounds the aperture 48a, and the inner radial portion of the radially-extending arm 114 of the flinger 110, which faces or abuts the inner face of the backplate 48.

Referring back to FIGS. 4 and 5, the rearward axial side 170 of the spacer 50 further includes the second rearward axial face 212 extending radially outward from the first inner radial wall 180 (e.g., extending radially outward therefrom) and a second inner radial wall 216 connected to the second rearward axial face 212 (e.g., extending axially rearward therefrom). In the illustrated exemplary embodiment, the second rearward axial face 212 is positioned radially outward of the first rearward axial face 174. The second rearward axial face 212 may be substantially planar in a direction perpendicular to the axis 30 (e.g., being oriented in a plane perpendicular to the axis 30) or have another suitable shape (e.g., being tapered, such as being conical relative to the axis 30). The second inner radial wall 216 forms an inner radial surface that faces radially inward toward the axis 30. The second inner radial wall 216 extends axially rearward (toward the bearing housing 52) in a direction along the axis 30. The second inner radial wall 216 may, for example, be generally circular in cross-section with a constant or varying radius (e.g., being cylindrical, conical, or otherwise tapered).

As best seen in FIG. 6, the second rearward axial face 212 and the second inner radial wall 216 define a first connector pocket 220 (e.g., first connector space). In the example shown in FIGS. 5 and 6, the first connector pocket 220 is axially aligned with the radial channel 72 of the bearing cartridge 56 to receive the first connector 94 therein. When positioned in the first connector pocket 220, the first connector 94 is spaced apart axially from the second rearward axial face 212 of the spacer 50.

Referring back to FIGS. 4, 5 and 6, the rearward axial side 170 of the spacer 50 further includes a third rearward axial face 224 and a third inner radial wall 228. The third rearward axial face 224 is connected to the second inner radial wall 216 (e.g., extending radially outward therefrom) and is radially positioned outward from the second rearward axial face 212. The third rearward axial face 224 may be substantially planar in a direction perpendicular to the axis 30 (e.g., being oriented in a plane perpendicular to the axis 30) or have another suitable shape (e.g., being tapered, such as being conical relative to the axis 30). The third inner radial wall 228 forms an inner radial surface that faces radially inward toward the axis 30. The third inner radial wall 228 extends inward (toward the bearing housing 52) in a direction along the axis 30 (e.g., extending axially rearward from the third rearward axial face 224). The third inner radial wall 228 may, for example, be generally circular in cross-section with a constant or varying radius (e.g., being cylindrical, conical, or otherwise tapered).

The third rearward axial face 224 and third inner radial wall 228 define a second connector pocket 230 as best seen in FIG. 6. In the illustrated example, the second connector pocket 230 is axially positioned in alignment with the second axial region of the outer race 70 of the bearing cartridge 56 between the radial channel 72 and the shoulder 74 to receive the second connector 106 therein. More particularly, and as referenced above, the second connector 106 is held axially between the spacer 50 and the bearing housing 52, for example, between the third rearward axial face 224 and a forward axial face 236, respectively, thereof. A fourth radial face 234 of the spacer 50, which extends radially outward from the third inner radial wall 228, may also abut against the forward axial face 236 of the bearing housing 52. While the first connector 94 and the second connector 106 have been referred to with identifying terms of "first" and "second," respectively, for differentiation therebetween, it should be understood that the first connector 94 and the second connector 106 may be referred to with different identifying terms (e.g., second and first, forward and rearward, another, etc.).

Referring to FIG. 4, the spacer 50 further includes the deflector 240. In the example, the deflector 240 includes a pair of walls 244 (e.g., pair of deflector walls) disposed on opposite sides of a guide surface 248. In the illustrated embodiment, the guide surface 248 extends from the first rearward axial face 174, and the pair of walls 244 extend from respective ends of the first inner radial wall 180, the second inner radial wall 216, and the third inner radial wall 228 of the spacer 50. The guide surface 248 extends from the first rearward axial face 174 in at least a partially axially rearward direction (i.e., toward the bearing housing 52 and/or away from the compressor 36) and terminates at a deflector end 249. The deflector end 249 may, for example, be positioned rearward of the forward axial end 60 of the bearing cartridge 56.

In the deflector 240 shown in FIG. 5, the guide surface 248 is oriented at an angle 250. In one example, angle 250 is between 30 and 60 degrees from horizontal, extending downward and rearward away from the compressor 36 (e.g., between 40 and 50 degrees, such as approximately 45 degrees). Alternatively, the guide surface 248 may extend at another angle or in a convoluted profile (e.g., curving moving axially and/or curving radially relative to the axis 130). The walls 244 and the guide surface 248 of the deflector 240 form a deflector trough 254 (e.g., a lubricant deflector trough), which is positioned at the bottom or lower portion of the spacer 50. It is understood that the deflector 240 can take other forms, orientations, angles, shapes, sizes and positions relative to body 150, other than the example shown and described above.

As best seen in FIG. 5, in operation, lubricant exiting the bearing cartridge 56 axially forward toward the compressor housing 38 is deterred from further axial travel toward the backplate 48 by the first rearward axial face 174 of the spacer 50, which may be positioned concentrically about turbo shaft 26. Lubricant contacting the first rearward axial face 174 will be urged by the force of gravity toward the bottom or lower end of the spacer 50. The deflector 240 further deflects, collects, and/or guides the lubricant away from the backplate 48 and the compressor housing 38 toward the deflector end 249.

In the example shown in FIG. 4, the spacer 50 includes one or more anti-rotation features configured as mounting bosses 260 (e.g., two mounting bosses, three, four as shown, or other suitable number), which are used to connect the spacer 50 to the backplate 48 and to the bearing housing 52 as best seen in FIG. 6. The mounting bosses 260 prevent rotational movement of the spacer 50 relative to the bearing housing by being received in and tangentially engaging corresponding recesses of the bearing housing 52 and/or by use of fasteners 263. In the example, each mounting boss 260 extends radially outward from the outer radial surface 154 and is angularly spaced from the other mounting bosses 260. Each mounting boss 260 includes a through hole 262 (e.g., a mounting hole). Fasteners 263 (e.g., through fasteners), for example threaded bolts, can be inserted through the respective through holes 262 for engagement of the fastener 263 into mating threads (not shown) in the bearing housing 52. Relative rotation and radial movement between the spacer 50 and the bearing housing 52 is prevented by tangential and radial engagement, respectively, with the fasteners 263 that extend axially therethrough, and/or tangential engagement of the mounting bosses 260 with the corresponding recesses of the bearing housing 52 (e.g., those portions of the bearing housing 52 defining such recesses). Radially outer surfaces of the mounting bosses 260 may also function as pilot surfaces that radially engage the corresponding recesses of the bearing housing 52 (e.g., those portions of the bearing housing 52 defining such recesses), so as to radially locate and retain the spacer 50 relative to the bearing housing 52.

The spacer 50 is additionally fixed axially to the bearing housing 52. For example, on tightening of the fastener 263, the spacer 50 is axially fixed from movement relative to the backplate 48 and the bearing housing 52. As referenced above, by the spacer 50 being held axially relative to the bearing housing 52, the bearing cartridge 56 (e.g., the outer race 70 thereof) may be held axially by way of the second connector 106 being held axially between the spacer 50 and the bearing housing 52. The fasteners 263 may, as shown, extend through both the backplate 48 and the spacer 50 and be threaded into the bearing housing 52, such that the spacer 50 is compressed and retained axially between the backplate 48 and the bearing housing 52. Alternatively, one or more of the fasteners 263 may extend through the backplate 48 into the bearing housing 52, but not through the spacer 50 (e.g., being positioned radially outward thereof), while compressing the spacer 50 between the backplate 48 and the bearing housing 52.

In at least one embodiment, the mounting bosses 260 can be oriented around the spacer 50 such that the mounting bosses 260 only with the recesses and/or the through holes 262 only align with threaded holes in the bearing housing 52 in a single orientation. Such an orientation may prevent installation of the spacer 50 relative to the bearing housing 52 in an incorrect orientation (e.g., in an orientation in which the deflector 240 is not positioned at the bottom or lower portion of the spacer 50). One advantage of the illustrated and described turbocharger 10A and the spacer 50 as seen in FIG. 3 is that the spacer 50 and flinger 110 can be preassembled together with the backplate 48 and connected as a single unit to the bearing housing 52. The compressor 36 (e.g., the compressor housing 38) may be connected to the bearing housing 52 after the subassembly of the backplate 48, the spacer 50, and the flinger 110 are coupled to the bearing housing 52.

It is understood that the spacer 50 may include a greater number, a fewer number, or no mounting bosses 260. It is further understood that when included, mounting bosses 260 may take other forms, shapes, sizes, positions and orientations relative to the body 150. It is further understood that spacer 50 can be mounted and/or connected to the compressor housing 38, or the backplate 48, and the bearing housing 52 by other structures or methods. For example, the spacer 50 can be connected to the backplate 48 or the bearing housing 52 through other mechanical fasteners or adhesives, through physical engagement of structural features between the spacer 50 and the backplate 48 and bearing housing 52, or other known methods and devices for axially and angularly fixing the position of spacer 50. As a further example, the one or more anti-rotation features that prevent rotation of the spacer 50 relative to the bearing housing 52 may include a shape of the outer radial surface 154 of the spacer 50 engaging a corresponding inner radial surface of the bearing housing 52 that engage each other tangentially (e.g., the outer radial surface 154 including a planar surface portion).

Referring to the spacer 50 in FIG. 2, the forward axial side 166 of the spacer 50 includes a forward axial surface 266 that radially and angularly extends around a portion of the body 150. In the example, the forward axial surface 266 is positioned axially forward (toward the compressor housing 38) from the mounting bosses 260. The outer radial surface 154 may function as a pilot surface that is received axially within a recess defined by an inner radial wall 280 of the backplate 48 (e.g., of corresponding circular cross-sectional shape), so as to radially locate and hold the spacer 50 relative to the backplate 48. The forward axial surface 266 may be spaced apart from the backplate 48 when the spacer 50 is installed on the backplate 48, while another forward axial surface 282 (e.g., of the mounting bosses 260) is axially engaged by the backplate 48 to compress the spacer 50 between the backplate 48 and the bearing housing 52.

In the FIG. 2 example, the spacer 50 further includes one or more alignment tabs 270 (two alignment tabs 270 are shown) extending axially forward from the forward axial surface 266. Each alignment tab 270 is positioned to coordinate and be received in an axial cavity (not shown) in the backplate 48 to align and angularly position the spacer 50 relative to the backplate 48 and compressor housing 38. On installation of the spacer 50 to the backplate 48, the alignment tabs 270 and the coordinating backplate cavity serve to prevent rotation of the spacer 50 about the axis 30 relative to the compressor housing 38. As discussed, the mounting bosses 260 and the fasteners 263 therethrough prevent rotation of the spacer 50 about the axis 30 relative to the bearing housing 52. It is understood that the alignment tabs 270 can take other forms, shapes, sizes, positions and orientations. It is further understood that spacer 50 may include no alignment tabs 270 in certain embodiments. For example, the alignment tabs 270 may be unnecessary in certain embodiments in which the fasteners 263 pass through holes in the backplate 48, the through holes 262 in the mounting bosses 260, and into threaded holes in the bearing housing 52. In such an embodiment, the fasteners 263 may maintain rotational orientation of the backplate 48, spacer 50, and bearing housing 52 without the use of the alignment tabs 270.

As best shown in FIGS. 2 and 6, the forward axial side 166 further includes a forward axial face 274 axially spaced and facing an opposite direction from the first rearward axial face 174 on the rearward axial side 170 of the spacer 50. The first inner radial wall 180 extends axially forward, positioning the forward axial face 274 in a cavity or open space in the backplate 48. The forward axial surface 252 of the deflector 240 extends axially rearward and radially outward (i.e., downward) from the forward axial face 274.

In one example, the spacer 50 is made from sintered powdered metal, such as a powdered aluminum. In areas where close tolerances or precision surfaces are needed, the area may be machined or finished through conventional manufacturing techniques. The spacer 50 may be made from other materials and through other manufacturing processes. It is understood that spacer 50 may take other forms, sizes, shapes, configurations and orientations relative to the described interior features of the spacer 50 as described and illustrated, as well as relative to the compressor housing 38, bearing housing 52, flinger 110 and bearing cartridge 56.

Further, the turbocharger 10A and the spacer 50 further increase the performance of turbocharger 10A and reliability through improvement of the turbocharger 10A lubrication system by positioning the first rearward axial face 174 in close axial and radial proximity to the forward axial face 120. This may provide a small opening or distance of the lubricant gap 210 which may deter lubricant from passing from the bearing housing 52 into the compressor housing 38. The position and orientation of the deflector 240 and the exemplary angled orientation of the guide surface 248, further deflects lubricant away from the compressor housing 38 while directing the gravity fed lubricant to a desired location back to the engine lubrication system.

As described above and illustrated, the spacer 50 further provides advantages of axially securing or affixing the bearing cartridge 56 while preventing rotation of the outer race 70 relative to the spacer 50 and bearing housing 52.

While the invention has been described in connection with certain embodiments, it is to be understood that the invention is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A turbocharger comprising:
   a compressor housing having a backplate;
   a turbo shaft extending through the backplate and rotatable about an axis;
   a bearing housing through which the turbo shaft extends, the backplate being positioned between an interior of the compressor housing and an interior of the bearing housing;
   a bearing cartridge positioned in the bearing housing and rotatably supporting the turbo shaft therein; and
   a spacer engaged with the bearing housing and an outer radial portion of the bearing cartridge to prevent rotation therebetween, the spacer including a deflector formed integrally therewith that extends downwardly and rearwardly towards the bearing housing to direct a lubricant axially away from the compressor housing.

2. The turbocharger of claim 1, wherein the spacer includes a body, the body comprising:
   an outer radial perimeter;
   an inner radial perimeter defining a turbo shaft opening operable for the turbo shaft to axially extend therethrough;
   a forward axial side opposing the backplate; and
   a rearward axial side opposing the bearing housing, the rearward axial side axially spaced from the forward axial side along the axis.

3. The turbocharger of claim 2, wherein the rearward axial side of the body of the spacer further comprises:

a first rearward axial face that extends radially from the inner radial perimeter; and a first inner radial wall extending axially from the first rearward axial face, the first inner radial wall and the first rearward axial face defining a bearing pocket in which is received the outer radial portion of the bearing cartridge.

4. The turbocharger of claim 3, wherein the spacer includes a spacer bearing portion positioned in the bearing pocket and connected to the first inner radial wall; and wherein the outer radial portion of the bearing cartridge is an outer race that includes an anti-rotation feature, the spacer bearing portion being engaged with the anti-rotation feature to prevent rotation of the outer race about the axis relative to the spacer.

5. The turbocharger of claim 4, wherein the spacer bearing member includes a bearing wall extending radially between curved surfaces of the first inner radial wall and axially along the axis, the bearing wall forming the anti-rotation feature as two planar surfaces angularly separated by a scalloped portion.

6. The turbocharger of claim 4, further comprising a connector that resists axial movement of the bearing cartridge relative to the spacer along the axis.

7. The turbocharger of claim 6, further comprising a flinger concentrically positioned about the turbo shaft for rotation therewith, the flinger having a radially-extending flange that extends radially beyond the inner radial perimeter of the spacer and that forms a forward axial face in close axial proximity to define a lubricant gap therebetween.

8. The turbocharger of claim 3, wherein the rearward axial side of the spacer further comprises:

a second rearward axial face extending radially outward from the first inner radial wall; and a second inner radial wall extending axially rearward from the second rearward axial face, the second inner radial wall and the second rearward axial face defining a first connector pocket in which is positioned a first connector that resists axial movement of the bearing cartridge relative to the spacer along the axis.

9. The turbocharger of claim 8, wherein the rearward axial side of the spacer further comprises:

a third rearward axial face extending radially outward from the second inner radial wall; and a third inner radial wall extending axially rearward from the third rearward axial face, the third inner radial wall and third rearward axial face defining a second connector pocket in which is positioned a second connector that is engaged with the spacer, the bearing cartridge, and the first connector to resist axial movement of the bearing cartridge relative to the spacer along the axis.

10. The turbocharger of claim 3, wherein the deflector is positioned on the rearward axial side of the spacer, the deflector further comprising:

a pair of deflector walls spaced laterally relative to the axis; and a guide surface connected to the pair of deflector walls and the first rearward axial face, the pair of deflector walls and the guide surface defining a trough.

11. The turbocharger of claim 10, wherein the guide surface extends rearward from the first rearward axial face.

12. The turbocharger of claim 2, wherein on the forward axial side of the spacer, the outer radial perimeter forms a pilot surface that is received axially within a recess defined by an inner radial wall of the backplate to radially locate the spacer relative to the backplate.

13. The turbocharger of claim 2, further comprising at least two mounting bosses connected to the outer radial perimeter, the two mounting bosses angularly spaced from one another about the axis and extending radially outward from the outer radial perimeter, each mounting boss defining a mounting hole operable to receive a through fastener to connect the backplate to the spacer and to the bearing housing to rotationally and axially fix the spacer to the turbocharger.

14. The turbocharger of claim 2, wherein the deflector extends in a radial direction past the outer radial perimeter of the body.

15. The turbocharger of claim 14, wherein the deflector extends axially rearward of a forward axial end of the bearing cartridge.

16. The turbocharger of claim 14, wherein the rearward axial side of the body further comprises:

a first rearward axial face that extends radially from the inner radial perimeter;

a first inner radial wall extending axially from the first rearward axial face, the first inner radial wall and the first rearward axial face defining a bearing pocket in which is received the outer radial portion of the bearing cartridge; and wherein the deflector comprises a pair of walls disposed on opposite sides of a guide surface, wherein the guide surface extends from the first rearward axial face and the pair of walls extend from the first inner radial wall.

17. A turbocharger comprising:

a compressor housing having a backplate;

a turbo shaft extending through the backplate;

a bearing housing through which the turbo shaft extends, the backplate being positioned between an interior of the compressor housing and an interior of the bearing housing;

a bearing cartridge positioned in the bearing housing and rotatably supporting the turbo shaft therein;

a flinger concentrically positioned about the turbo shaft for rotation therewith and having a radially-extending flange; and a spacer engaged with the bearing housing and an outer radial portion of the bearing cartridge to prevent rotation therebetween, the spacer extending radially inward to an inner radial perimeter through which the turbo shaft and the flinger extend, and the spacer being positioned axially between the radially-extending flange and the backplate.

18. The turbocharger according to claim 17, wherein a forward axial face of the radially-extending flange axially opposes and is in close proximity with a rearward axial face of the spacer to form a lubricant gap.

19. The turbocharger according to claim 17, wherein the spacer includes an integral lubricant deflector that directs lubricant axially away from the compressor housing.

20. A turbocharger comprising:

a compressor housing having a backplate;

a bearing housing;

a turbo shaft extending through the backplate and the bearing housing, the turbo shaft being rotatable about an axis;

a bearing cartridge positioned in the bearing housing and engaged with the turbo shaft;

a spacer positioned between the backplate and the bearing housing, the spacer comprising:

a first rearward axial face that is positioned axially forward from and opposing the bearing cartridge;

a first inner radial wall connected to the first rearward axial face and axially extending along the axis, the first rearward axial face and the first inner radial wall defining a bearing pocket that engages and prevents rotation of an outer radial portion of the bearing cartridge relative to the bearing housing;

a second rearward axial face connected to the first inner radial wall and extending radially outward therefrom;

a second inner radial wall connected to the second rearward axial face and extending therefrom along the axis, the second rearward axial face and the second inner radial wall defining a first connector pocket; and an integral lubricant deflector having a pair of walls and a guide surface, the guide surface connected to the pair of walls and extending downwardly and rearwardly towards the bearing housing so as to define a lubricant deflector trough in communication with the bearing pocket and the first connector pocket, the integral lubricant deflector operable to deflect lubricant exiting the bearing cartridge axially away from the compressor housing;

a first connector positioned in the first connector pocket, the first connector engaged with the bearing cartridge to prevent axial movement of the bearing cartridge relative to the spacer along the axis; and a flinger extending axially through the backplate and concentrically positioned about the turbo shaft, the flinger having a radially extending flange that axially opposes the first rearward axial face of the spacer.

21. The turbocharger of claim 20 wherein the guide surface extends at an angle between 30 and 60 degrees relative to the axis from the first rearward axial face.

22. The turbocharger of claim 21 wherein the spacer further comprises:

a third rearward axial face that is connected to the second inner radial wall and extending radially outward therefrom; and a third inner radial wall connected to the third rearward axial face and axially extending therefrom along the axis, the third inner radial wall and third rearward axial face defining a second connector pocket in which is received a second connector that is engaged with the spacer, the bearing housing, the first connector, and the bearing cartridge to prevent axial movement of the bearing cartridge relative to the spacer along the axis, wherein the first connector is a snap ring and the second connector is a thrust bearing.

* * * * *